Aug. 4, 1964  E. HAUENSTEIN  3,143,675
ELECTRIC MOTOR COOLING IN A CENTRIFUGAL PUMP UNIT
Filed May 1, 1961  2 Sheets-Sheet 1

Inventor
Ernst Hauenstein
By
Watson, Cole, Grindle & Watson
Attys.

Aug. 4, 1964     E. HAUENSTEIN     3,143,675
ELECTRIC MOTOR COOLING IN A CENTRIFUGAL PUMP UNIT
Filed May 1, 1961     2 Sheets-Sheet 2
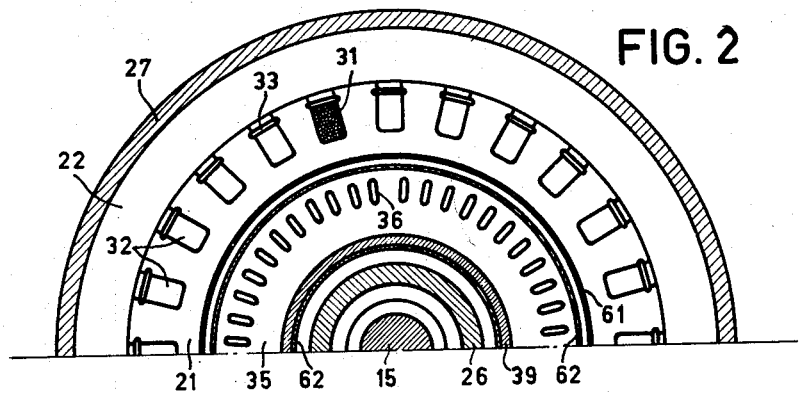
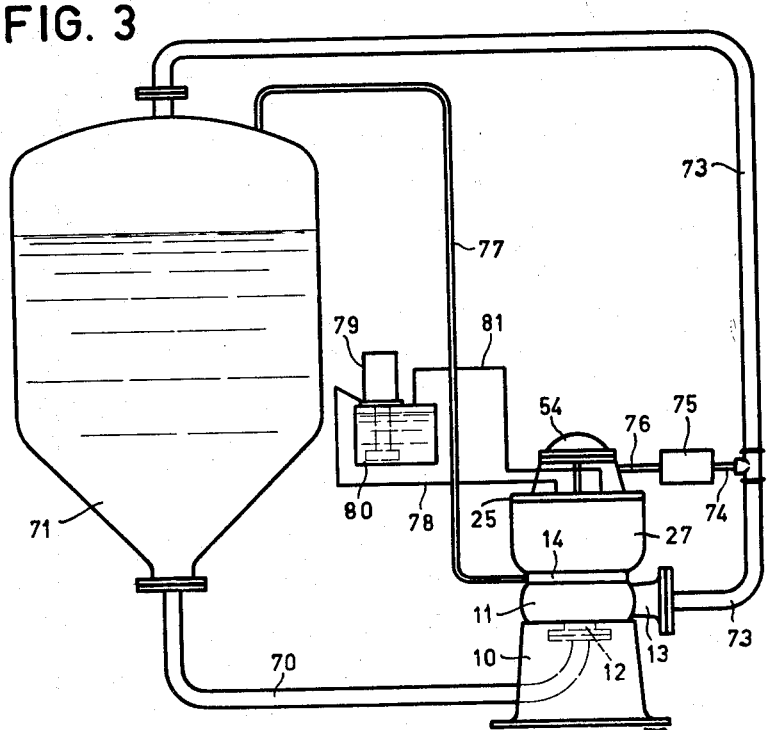
Inventor
Ernst Hauenstein
By
Watson Cole Grindle + Watson
Attys.

United States Patent Office 3,143,675
Patented Aug. 4, 1964

3,143,675
ELECTRIC MOTOR COOLING IN A
CENTRIFUGAL PUMP UNIT
Ernst Hauenstein, Lauterbrunnen, Switzerland
Filed May 1, 1961, Ser. No. 106,932
Claims priority, application Switzerland May 3, 1960
4 Claims. (Cl. 310—54)

This invention relates to a pumping unit consisting of a centrifugal pump and an electric motor, of the type in which the impeller of the pump and the rotor of the motor are coaxially arranged in intercommunicating spaces and the magnet iron of the motor stator has grooves closed towards the air gap.

Pumping units known heretofore, in which the impeller and the rotor are arranged in intercommunicating spaces have in the air gap of the motor a slit tube which is connected to the stator and prevents access of the delivery liquid to the winding and magnet iron of the stator. Because of the internal warming caused by eddy currents and magnetic influences, the metallic slit tube requires constant cooling of the motor stator and motor rotor. For obvious reasons, the wall thickness of the slit tube must be kept comparatively thin, which involves the drawback that, when using the pumping unit for the delivery of corrosive and oxydizing liquids, the slit tube is liable to be eaten through relatively quickly. Thus a metallic slit tube has properties which are opposed to each other with respect to the chemical and magnetic requirements.

In another conventional pumping unit, the magnet iron of the motor stator possesses grooves which are closed towards the air gap and open radially outwards and into which the winding is laid, as well as an annular magnet-iron part snugly enclosing the grooved magnet-iron part outside. Moreover, in this construction, the grooves of the motor rotor are also closed towards the air gap. The magnet-iron parts of rotor and stator are laminated of dynamo sheets in the usual way. In spite of the adoption of impregnated paper sealing means between the dynamo sheets and outside them, there is the disadvantage that neither the sealing places nor the dynamo sheets themselves are chemically constant against aggressive media, such as acids and bases.

The present invention permits of obviating the described drawbacks of known constructions. To this end the pumping unit according to the invention is principally characterized in that at least the magnet-iron packs of the motor stator and rotor are at their peripheral areas facing the air gap provided with a coating resistant to acids and bases.

Further features of the invention will appear from the following description and the claims, taken in conjunction with the accompanying drawing wherein there is shown, purely by way of example, one form of embodiment incorporating the invention.

In said annexed drawing:

FIG. 2 shows a part-sectional view on the line II—II of FIG. 1;

FIG. 3 represents diagrammatically an example of application of the pumping unit.

Figure 1:
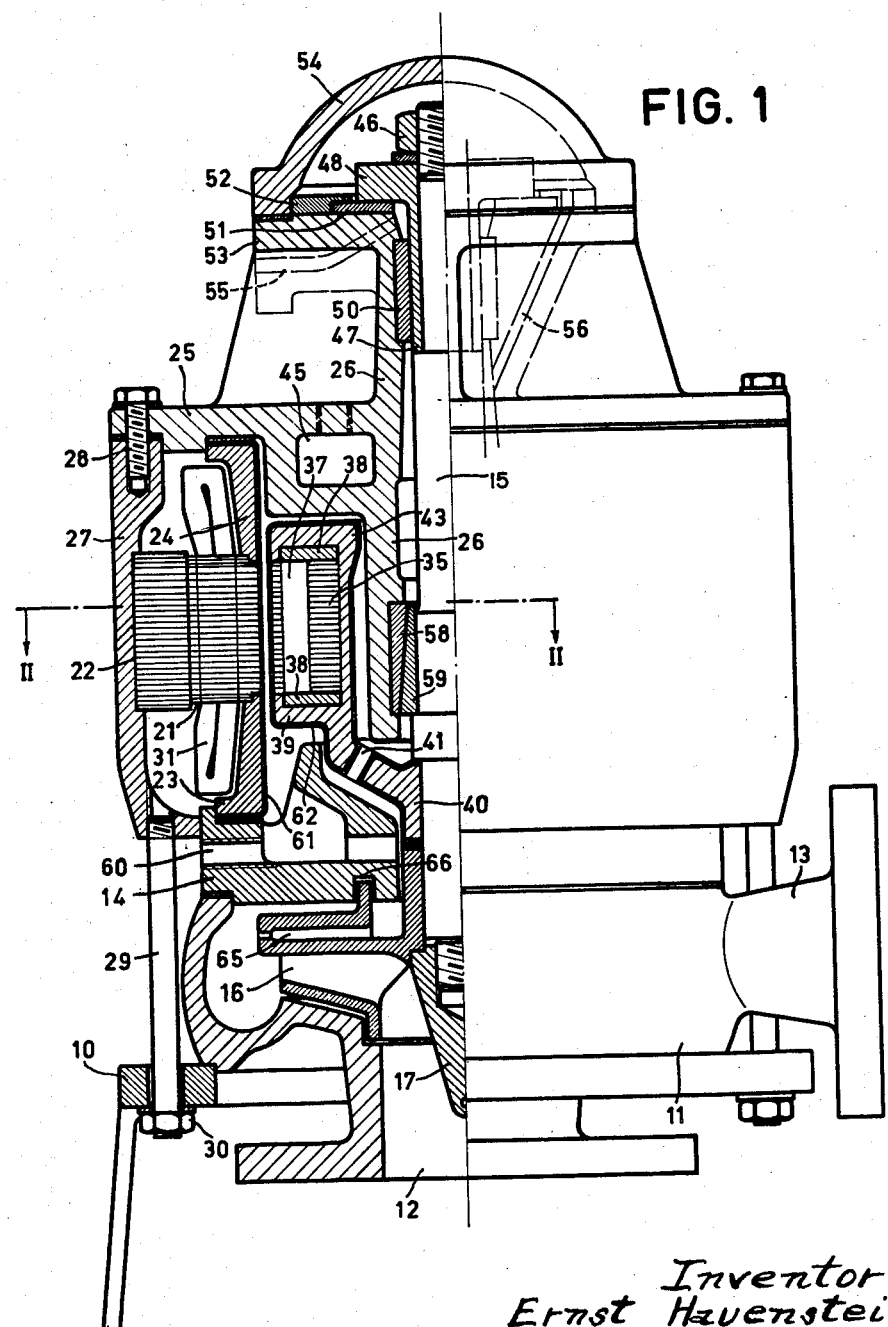
FIG. 1 shows a pumping unit partly in view and partly in axial section.

According to FIG. 1, a carrier frame 10 supports a casing 11 of a centrifugal pump which below has an inlet opening 12 and laterally a discharge branch 13. Above, said casing is provided with an annular cover 14 forming a partition between the pump and the electric motor for driving the same. On the lower end portion of a vertical shaft 15 common to the pump and motor, and whose bearing will be explained later, there is mounted an impeller 16 which is retained by an outwardly tapered nut 17 screwed on a threaded portion of said shaft.

The magnet iron of the stator comprises two axially interengaging annular dynamo-sheet packs 21 and 22, the inner of which is held between two support rings 23 and 24. The lower support ring 23 is seated on the cover 14, whereas the upper support ring 24 has mounted thereon a flange 25 of a bearing sleeve 26, in which the shaft 15 is rotatably mounted. The outer dynamo-sheet pack 22 is arranged within a sleeve-like casing 27 of the motor. By screws 28 the casing is secured to said flange 25 and by screw-bolts 28 and pertinent nuts 30 connected to the carrier frame 10, whereby the parts 10, 11, 14, 23, 21, 24, 25 and 27 are held together. The support rings 23, 24 extend axially beyond the heads of the electric stator winding 31. According to FIG. 2, the latter is lodged within grooves 32 which are arranged within the magnet-iron part 21 so as to be open radially outwards and closed towards the air gap between the stator and rotor of the motor. The winding rods may therefore be laid into the grooves 32 from the outer circumference of the inner magnet-iron part 21, prior to pushing thereover the outer magnet-iron part 22. By means of groove keys 33, the winding 33 is secured in the grooves 32.

The magnet iron 35 of the rotor is constituted by an annular dynamo-sheet pack and has grooves 36 closed towards the air gap of the motor, as shown in FIG. 2. The grooves 36 receive the aluminum conductors 37 of a squirrel-cage armature winding. The extremities of the conductors 37 are electrically conductively interconnected by rings 38, which also consist of aluminum. The magnet iron 35 and squirrel-cage armature winding 37, 38 are embedded in a metallic part 39 which completely encloses the squirrel-cage armature winding. Both magnet iron 35 and metallic part 39 possess a considerably higher melting point than the squirrel-cage armature winding 37, 38. The whole motor rotor has the shape of an upwardly open bell, at the bottom of which there is formed a hub 40 seated on shaft 15. The bottom of said bell has a few apertures 41 which are situated at some distance from the cylindric inner surface of the metallic part 39, facing the sleeve 26. Towards the top of the rotor, the inner surface 42 exhibits a radially inwardly projecting circumferential bulge 43 reaching nearly to the sleeve 26.

Direct over the upper end of the rotor, within the flange 25 of the bearing sleeve 26 there is provided an annular cavity 45 serving as a cooler and having connections for piping to allow a cooling medium to pass through.

At the top of the shaft 15, a sleeve 47 with an outer flange 48 is attached by means of a nut 45. Said sleeve is surrounded by a bearing sleeve 50 firmly arranged within the top of sleeve 26. The flange 48 is supported on a foot-step ring 51 which is centred by means of a holding ring 52 on an end flange 53 of the sleeve 26. The whole foot-step bearing is closed by a hood-shaped cover 54 mounted on the end flange 53. A duct 55 for supplying a lubricant opens into an annulus between bearing sleeve 50 and foot-step-ring 51. Another duct 56 for lubricant leads from the cavity below the cover 54 to an annular hollow space below the bearing sleeve 50, surrounding the shaft 15. Within the bottom part of the sleeve 26 there is a bearing sleeve 58 having rotatably supported therein a sleeve 59 firmly seated on shaft 15. At the ends facing each other, the two last-named sleeves 58 and 59 are tapered in such a way as not to allow the shaft 15 to move axially upwards.

At its periphery, the cover 14 has a threaded bore 60 which leads outwards from the rotor-containing space.

Pump casing 11, cover 14, shaft 15, impeller 16, nut 17, flange 25 and sleeve 26, nut 46, bearing sleeve 47 with flange 48, and also the sleeves 58 and 59 consist of materials which resist aggressive chemical substances.

However, the required magnetic properties of the dynamo-sheet packs 21, 22 and 35 render it impossible also to make the magnet-iron parts of a material resistant to aggressive chemical subsances. For this reason special provisions are made for protecting the magnet-iron parts.

The inner surface of the stator iron pack 21 facing the air gap and the level surfaces of the support rings 23 and 24 are provided with a coating 61 which resists acids and bases, extends to the axial ends of the support rings 23, 24 and is preferably an enamel layer. Advantageously, the dynamo sheets of the magnet-iron pack 21 adjacent to each other are additionally insulated from and cemented to each other by the same enamel material. The support rings 23, 24 could also have a coating on their radial outer sides. In a similar way, the whole rotor 37, 38, 39 is covered with a coating 62 resistant to acids and bases, which again is preferably an enamel layer. Preferably the single dynamo sheets of the magnet-iron pack are likewise insulated from and cemented to one another by the same enamel material.

It is understood that enamel coating on objects of all kinds must be burnt-in at a relatively high temperature. This happens with the parts 21, 23 and 24 before the winding 31 is laid into the outwardly open grooves 32. In the case of the rotor, the squirrel-cage armature winding 37, 38 must, however, be built-in prior to applying and burning-in the coating 62. At the temperature required for burning-in, the aluminum of the squirrel-cage armature winding will melt or at least become very soft. This, however, is not harmful inasmuch as the aluminium is everywhere surrounded by material of a higher melting point and thus cannot run out.

The impeller 16 has formed thereon a hollow body 65 which, with the cover 14, constitutes a labyrinth packing 66 and at the same time is designed as an additional centrifugal delivery wheel, in order to convey into the pressure space of the pump the liquid that has penetrated into the rotor-containing space of the motor.

For a better understanding of the action of the aforedescribed pumping unit, reference is made to FIG. 3 which diagrammatically shows one application thereof. The inlet opening 12 of the pump is connected through piping 70 to the outlet of a chemical vessel 71 which, for instance, contains an acid that has to be continuously circulated. From the discharge branch 13 of the pump, another piping 73 leads back to the top of the vessel 71. The piping 73 has further a branch 74 leading to a filter 75 (only diagrammatically indicated) which in turn communicates through a piping 76 to the aforementioned duct 55 for a lubricant. Thus the bearings 15 of the shaft are lubricated by the same chemically aggressive liquid that has to be delivered by the pump. The aforesaid threaded bore 60 has connected thereto a piping 77 leading to the top of the vessel 71. The hollow space 45 of the motor, serving as cooler, is connected through a piping 78 to the delivery side of a small servo-pump having attached thereto a tank 80 for a cooling medium. A further piping 81 is provided for the return of the cooling medium from the hollow space 45 to the tank 80.

The action of the aforedescribed plant and especially of the pumping unit is as follows:

If the winding 31 of the motor is supplied with current, the rotor, shaft 15 and impeller 16 start to rotate. Thus liquid from the vessel 71 is returned to it through piping 70, the pump and piping 73. A minor part of the quantity of liquid delivered is led through piping 74, filter 75 and piping 76 into the lubricant duct 55, whence it reaches the sliding faces between the bearing sleeves 47 and 50 as well as between the flange 48 and the foot-step ring 51, whereby the respective bearings are lubricated. Due to centrifugal action of the flange 48, a considerable portion of the lubricant is conveyed between the flange 48 and foot-step ring 51 radially outwards into the space beneath the hood-like cover 54. Thereafter the lubricant flows through the duct 56 into the annulus directly surrounding the shaft 15 below the bearing sleeves 47 and 50, in order to reach in this way also the tapered bearing sleeves 58, 59 and to lubricate the sliding faces therebetween. Since the lubricant is taken from the delivery side of the pump, it is under a considerable static pressure. Because of the liquid film between the flange 48 and foot-step ring 51, the whole rotor of the pumping unit is somewhat raised in the axial direction from its position of rest, as far as the tapered bearing rings 58, 59 of the liquid film forming therebetween will permit. A state of equilibrium sets in.

The liquid issuing downwards between the bearing sleeves 58, 59 reaches the bottom of the bell formed by the rotor and is then, due to centrifugal action, thrown against the cylindrical inner surface of the metallic part 39, i.e. against its coating 62, and spread thereover. The peripheral bulge 43 prevents the liquid being thrown out towards the air gap between the magnet-iron parts of rotor and stator. By the operation of the motor, its rotor becomes warmed. The heat is taken up for the major part by the liquid ring at the cylindrical inner surface of the rotor, the liquid evaporating and a substantially constant temperature of the rotor, corresponding to that of evaporation, will be attained. The upwardly rising vapours are cooled by the medium traversing the annulus 45 and the liquid is re-condensed. The condensate drops thereby fall onto the upper end of the rotor and are thrown radially outwards towards the layer 61 of the stator, which is thus also cooled. Since, in the described way, only vaporized and recondensed liquid enters the gap between the magnet-iron parts 21 and 35 of the motor, such liquid is entirely free from foreign matter and no choking of the narrow gap can take place. The support rings 23, 24 prevent entrance of the liquid into the space containing the winding 31.

The cooling-liquid leaving the gap downwards, collects on the cover 14 that forms a partition between the rotor-containing space of the motor and the impeller-containing space of the pump. The hollow body 65 forming one portion of the impeller 16 delivers the liquid collecting above the cover 14, into the pressure space of the pump. If between the tapered bearing rings 58, 59 more liquid enters the interior of the bell-shaped rotor than is evaporated, the liquid in excess can flow off through the apertures 41 to the outside of the rotor bell, whereupon such liquid will also be carried into the pressure space of the pump through the hollow body 65.

If the pumping unit is stopped, the interior of the casing 11 comes under the static pressure prevailing in vessel 71. Since now a delivering action of the hollow body 65 is wanting, the liquid rises from the impeller-containing space into the rotor-containing space, the gas present there, say air, being compressed, thus forming an air cushion which counteracts further rising of the liquid level. The support rings 23, 24 together with the coating 61 prevent the liquid from penetrating into the space containing the winding 31. The piping 77 opening into the screw-threaded bore 60 permits gas or air to flow into the rotor-containing space, when the unit is again set into operation, and thus the liquid will be carried away therefrom by means of the hollow body 65.

The aforedescribed pumping unit has the advantage that it requires no slit tube in the air gap of the motor. Apart from the adequate widening of the air gap, the comparatively thin enamel coatings 61 and 62 have no adverse influence on the magnetic field in the air gap. The coatings 61, 62, however, have the decided advantage of protecting the underlying parts, especially the magnet iron, from the destructive influences of aggressive chemical substances. In comparison with motors having a slit tube, no reduction in the efficiency consequently occurs, because of the coatings 61 and 62. If desired, magnetically conducting, chemically constant substances in fine dispersion may be added to the glaze for producing the coatings 61, 62.

The described way of cooling the motor by the liquid used at the same time as lubricant renders superfluous the provision of vanes on the rotor. In the pumping unit under review, such vanes would involve the disadvantage that, because of their numerous edges and corners, they could not be properly provided with a completely continuous enamel coating.

What I claim is:

1. Electric motor particularly for driving an impeller of a pump, comprising a bearing sleeve, a vertically arranged shaft rotatably mounted in the sleeve, a stator having a magnet iron pack and a winding within the magnet-iron pack, a rotor mounted on the shaft, a magnet-iron pack having a short circuited winding mounted in the rotor as a part thereof, the space between the pack of the stator and the pack of the rotor forming an air gap, means to direct a cooling fluid to the rotor with the latter formed as an upwardly open bell to receive the cooling fluid, and a radially inwards directed circumferential bulge at the upper edge of the bell reaching nearly to the bearing sleeve to prevent the exit of the cooling fluid and having a closed bottom end for the bell provided with at least one outlet opening in a bottom wall of the bell.

2. Electric motor according to claim 1, in which the stator extends immediately above the upper end of the bell-shaped rotor and acts as a cooler for the condensation of the vaporious cooling fluid which reaches the upper part of the stator for the purpose of cooling the magnet-iron pack of the stator.

3. Electric motor according to claim 1, in which the cage armature winding of the rotor is made of aluminum and is completely embedded in part in other materials having a high melting point.

4. Electric motor according to claim 1, in which the cage armature of the rotor is composed of aluminum is completely embedded in part of other materials with high melting point, the entire bell-shaped rotor being entirely coated with a protecting coating of a burned glass material and the rotor has a face surface for the magnetic-iron pack of the stator which is also provided with a burned glass material as a protective coating.

References Cited in the file of this patent

UNITED STATES PATENTS

| | | |
|---|---|---|
| 768,982 | Duncan | Aug. 30, 1904 |
| 2,001,799 | Seyfried | May 21, 1935 |
| 2,406,947 | Harlamoff | Sept. 3, 1946 |
| 2,536,638 | Greene | Jan. 2, 1951 |
| 2,787,960 | Wrightman | Apr. 9, 1957 |
| 2,837,669 | Fisher et al. | June 3, 1958 |
| 2,936,715 | Southam et al. | May 17, 1960 |